T. Brown
Cable Stopper.
N° 11,404.  Patented Jul. 25, 1854.
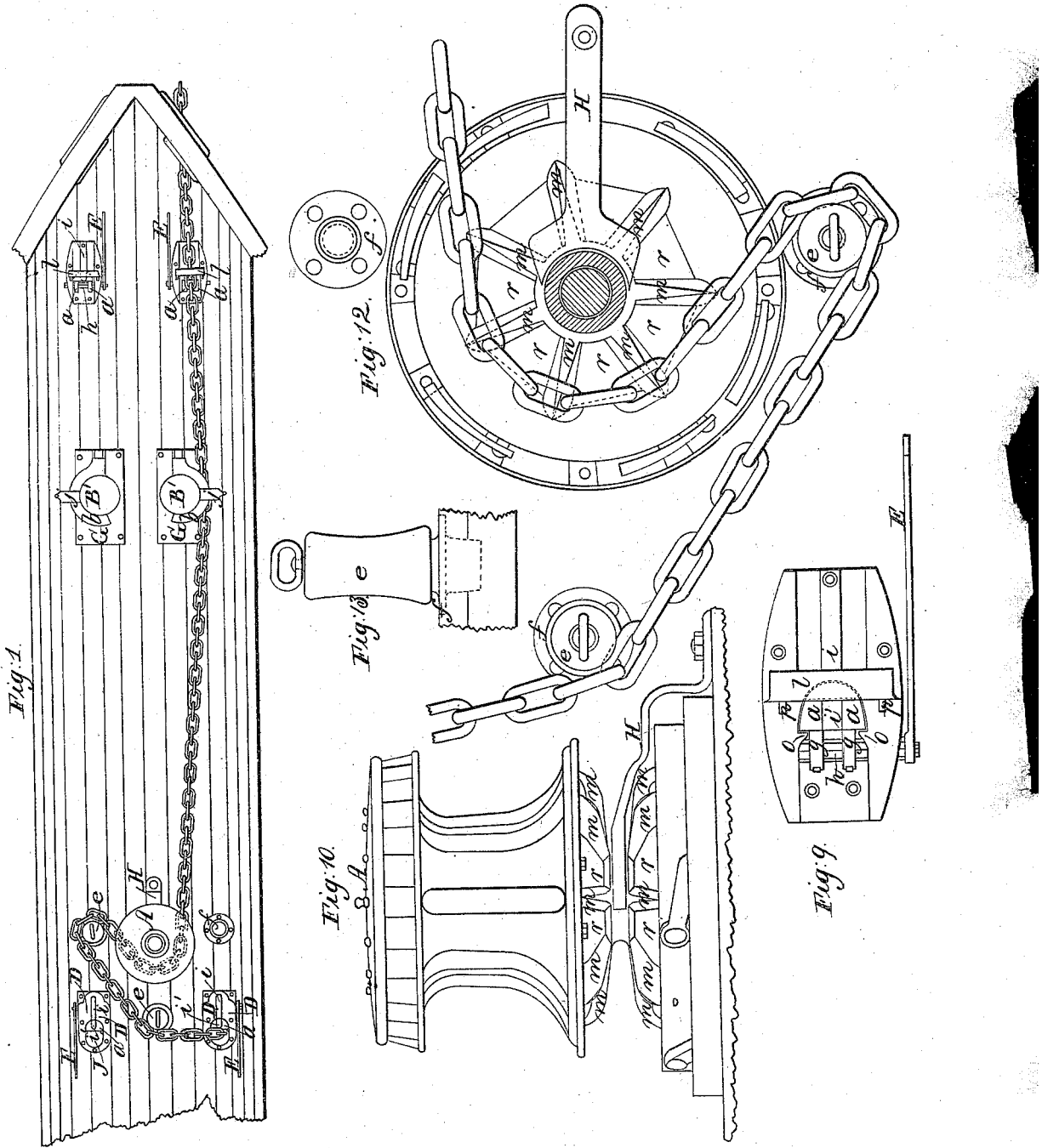

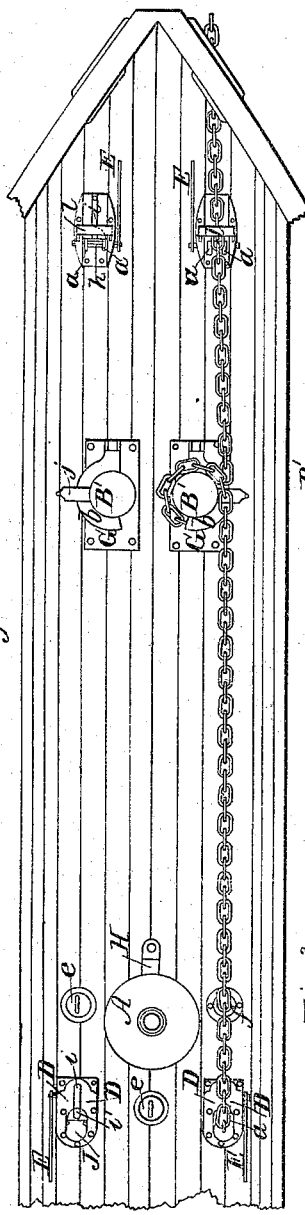

UNITED STATES PATENT OFFICE.

THOMAS BROWN, OF LONDON, ENGLAND.

IMPROVED ARRANGEMENT OF MEANS FOR WORKING AND STOPPING CHAIN CABLES.

Specification forming part of Letters Patent No. 11,404, dated July 25, 1854.

*To all whom it may concern:*

Be it known that I, THOMAS BROWN, of London, in the United Kingdom of Great Britain and Ireland, have invented sundry new and useful Improvements in the Apparatus for Working and Stopping Chain Cables; and I do hereby declare that the following is a full, clear, and exact description thereof, reference being had to the accompanying drawings, making a part of this specification.

Figure 1 of said drawings is a plan of a portion of the deck of a vessel with the aforesaid apparatus combined therewith and representing it as in the act of hauling in a chain cable and delivering it into the chain-locker. Fig. 2 is a plan of the same, representing the cable as in the act of running out; and Figs. 3 to 13, inclusive, represent in detail my improved apparatus for working and stopping chain cables.

Similar letters indicate like parts in all the figures.

The first feature of my invention consists in a new arrangement of a capstan and a series of removable guide-rollers, which can be arranged in relation to the two deck-pipes, riding-bits, and hawse-holes in such manner that a chain cable can be run from the deck-pipes to and through the hawse-holes without coming in contact with the capstan or guide-rollers, and also in such a manner that either one of a range of chain cables can be continuously hove in through either hawse-hole and be self-delivered into the locker through its deck-pipe by placing the guide-rollers in such positions with relation to the capstan and the deck-pipe as to force the cable into the hither side of a flaring and radially-flanged annular recess in the capstan, and then working said capstan in the usual manner.

The second feature of my invention consists in the combined and simultaneous use of two underlifting chain-cable stoppers, viz: one located at the mouth of the chain-locker deck-pipe and the other near the hawse-hole, for the purpose of enabling me, when necessary, to unerringly give the ship more cable, link by link, by alternately actuating the lifters of said stoppers.

In Figs. 1 and 2 of the accompanying drawings is shown the relative positions of the hawse-holes, bow-stoppers, riding-bits, capstan, removable rollers, after stoppers, and chain-locker deck-pipes. The outer side of each riding-bit and the bow and after stopper on each side of a vessel, it will be perceived, are in line with each other, and also in line with the hawse-hole and chain-locker deck-pipe on that side of a vessel. Near the lower end of the capstan there is formed a flaring and radially-flanged annular recess. *m m*, &c., are the flanges in said recess, and *r r*, &c., are the inclined surfaces between said flanges. The journals on the lower ends of the removable rollers *e e* are received into the flanged sockets *f f f*, which are let into the deck and secured with their flanges flush with the surface of the deck.

In Fig. 1 are shown the positions of the rollers *e e* for enabling the cable to be hove in through the starboard hawse-hole and in Fig. 12 are shown the positions of said rollers for enabling the cable to be hove in through the larboard hawse-hole. It will be perceived that the effect of the inclined radial flanges *m m*, &c., and the inclined surfaces *r r*, &c., between said flanges which form the upper and lower surfaces of the annular recess in the capstan will be to enable the links of any one of a range of chain cables to be received between said flanges in such a manner that the vertical links will be unerringly acted upon thereby, as shown in Fig. 12, by which the possibility of the surging of the cable as it is drawn in is avoided. Both the bow-stoppers and the after stoppers are arranged with under lifters *a* and levers E in such a manner that when the lifters are down the cable as it is hove in will be stopped at every flat link, and when said lifters are elevated the cable is allowed to run freely over the stoppers.

Figs. 8 and 9 show the form and arrangement of the bow-stopper. The body of the stopper, which is secured to the deck, has a groove *i* formed in the center of a recess in the inclined forward portion thereof, which leads up to the forward side of a vertical aperture that receives the lifter *a*. The lifter *a* has a rearwardly-inclined groove *i'* in it, which corresponds with the groove *i* in the recess in the forward portion of the body of the stopper. The front side of the lifter *a* and of the aperture that it works in is curved, as shown in the drawings. Consequently it will be perceived that when the lifter is allowed to descend into the position shown in Fig. 8 a recess will be formed in the rear of the shoulders D D on each side of the groove $i$, which will receive every flat link as the cable is hove in and which will stop the cable should there be any cessation in heaving it in. When a cable is to be run out, the lifter $a$ of the bow-stopper and also the lifter of the after stopper are elevated, so that the tops of the sides of their grooves $i'$ are even with the upper portions of the shoulders D D in the bodies of the stoppers, which will enable the cable to run freely over them.

To arrest the cable and bring a vessel to anchor, it is only necessary to allow the lifter $a$ in the after stopper to descend into the position shown in Fig. 3. The lifter $a$ in the bow-stopper is operated by means of the lever E, which is connected to the shaft $h$, and the cams or levers $g\ g$, which project from $h$ and fit into a recess in the rear side of said lifter, as shown in Fig. 8. The lifters in the after stoppers are operated in the same manner as the lifters in the bow-stoppers, save that the cams or short levers $g\ g$ fit into recesses in the forward side of said lifters, as shown in Fig. 3.

It will be perceived that the vessel itself hauls the cable out of its locker without any previous overhauling and that one man stationed at the after stopper can at any moment stop the cable and bring the vessel to anchor by simply letting down the lifter $a$ of the after stopper. Prior to allowing the cable to run out a turn of it is taken around the riding-bit, as usual, as shown in Fig. 2.

When a vessel is riding heavily at anchor and it is desired to give her more cable, it can be accomplished without the slightest danger of starting the anchor by manning the bow-stopper and the after stopper and by word of command causing their levers E to be alternately elevated and depressed, which will cause the cable to be let out in the following manner, viz: When the lever of the after stopper is elevated, the weight of the cable between the stoppers will depress it, and thereby draw a couple of links over the lifter of the after stopper, and when said lever descends the next flat link in succession will be arrested, and when the lever of the bow-stopper is elevated the weight of the cable outside the vessel will draw the cable taut between the stoppers, and thus little by little and with perfect safety any amount of cable can be given to a vessel, however heavily it may be riding at anchor. The after part of the body of the after stopper may be cast of such a shape as to form the mouth J of the chain-locker deck-pipe, as shown in Figs. 3 and 4.

The capstan is placed in such a position in relation to the chain-locker deck-pipes J that the cable can deliver itself directly into its appropriate locker from whichever hawse-hole it may be hove in at, as shown in Fig. 1.

H is a clearing-guide placed in front of the capstan, which is secured to the deck and combined with the capstan, as shown in Figs. 10 and 12. The use of said clearing-guide is to prevent the cable from being carried around so far as to be drawn in on the receiving side of the capstan when the cable is not allowed to pay itself directly into the chain-locker.

What I claim as my invention, and desire to secure by Letters Patent, is—

1. The arrangement of the capstan, the removable rollers, and the sockets for said rollers in such a manner and having such relations to the hawse-holes, chain-locker deck-pipes, and underlifting stoppers that a chain cable can be continuously hove in by means of said capstan and rollers or be directly run out of the lockers without any previous overhauling, substantially as herein set forth.

2. The arrangement of the within-described underlifting bow-stoppers and after stoppers, by which more cable can be gradually and controllably given to a vessel without riding heavily at anchor, substantially as set forth.

THOMAS BROWN.

Witnesses:
Z. C. ROBBINS,
J. I. BROWN.